United States Patent Office 3,193,576

Patented July 6, 1965

1

3,193,576

O-(POLYHALO - BICYCLO[2.2.1] - HEPT-5-EN-2-YL METHYLENE)-PHENOXY ACETIC ACIDS, SALTS, AMIDES AND ESTERS THEREOF

Sidney B. Richter, Chicago, Ill., assignor to Velsicol Chemical Corporation, Chicago, Ill., a corporation of Illinois No Drawing. Filed Apr. 24, 1961, Ser. No. 104,828
7 Claims. (Cl. 260—520)

This invention relates to new compositions of matter. More specifically, this invention relates to new chemical compounds of the structural formula

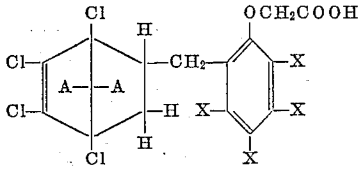

wherein each A is independently selected from the group consisting of chlorine and hydrogen atoms and lower alkoxy radicals and each X is independently selected from the group consisting of chlorine and hydrogen atoms and lower alkyl radicals; and their esters; their alkali metal salts; their amine salts; their alkylamine salts; their alkanolamine salts; and their amides. These new compounds are useful as pesticides, particularly as insecticides and miticides.

Compounds of the above structural formula can be readily prepared, for example, by the Diels-Alder addition of an appropriate chlorinated cyclopentadiene or an appropriate dialkoxytetrachlorocyclopentadiene with an appropirate o-allyl phenoxy acetic acid. The reaction can be carried out conveniently by heating the reactants for several hours at an elevated temperature, for example, the reflux temperature of a solvent solution of the reactants, and then separating the reaction product from the unreacted reactants by precipitation or other treatment. While the reaction can be effected satisfactorily with equimolecular proportions of the reactants, an excess of the chlorinated diene can be used. A solvent is not essential, but inert solvents can be used if desired. The residue remaining after the removal of the starting materials is often satisfactory for pesticidal use as such, but the product can be purified, for example, by recrystallization from a suitable solvent.

Chlorinated cyclopentadienes suitable for preparing the compounds of this invention are hexachlorocyclopentadiene, 1,2,3,4,5-pentachlorocyclopentadiene, and 1,2,3,4-tetrachlorocyclopentadiene. The latter two compounds can be obtained, for example, by the catalytic hydrogenation of hexachlorocyclopentadiene in the presence of a platinum or palladium catalyst as described by McBee and Smith, J. Am. Chem. Soc., 77, 389 (1955). When hexachlorocyclopentadiene is used as the starting material, both A's are chlorine atoms in the final product. When 1,2,3,4,5-pentachlorocyclopentadiene is used, one of A's is a chlorine atom and the other is a hydrogen atom. When 1,2,3,4-tetrachlorocyclopentadiene is used, both A's are hydrogen atoms.

Dialkoxytetrachloropentadienes suitable for preparing the compounds of this invention are the 1,2,3,4-tetrachloro-5,5-di-(unsubstituted lower alkoxy)-cyclopentadienes, preferably 1,2,3,4-tetrachloro-5,5-dimethoxy-cyclopentadiene and 1,2,3,4-tetrachloro-5,5-diethoxy-cyclopentadiene. These compounds can be obtained, for example, by the reaction of hexachlorocyclopentadiene with a suitable alkanol in the presence of base, as described by Newcomer and McBee, J. Am. Chem. Soc., 71, 946 (1949). When 1,2,3,4-tetrachloro-5,5-dimethoxy-cyclopentadiene

2 is used as the starting material, the A's are methoxy radicals in the final product. When 1,2,3,4-tetrachloro-5,5-diethoxy-cyclopentadiene is used, the A's are ethoxy radicals.

Suitable o-allyl phenoxy acetic acids for use in preparing the compounds of this invention are o-allyl phenoxy acetic acid, 2-allyl-4-chlorophenoxyacetic acid, 2-allyl-6-chlorophenoxyacetic acid, 2-allyl-4,6-dichlorophenoxyacetic acid, 2-allyl-4-methylphenoxyacetic acid, 2-allyl-4-ethylphenoxyacetic acid, 2-allyl-6-methylphenoxyacetic acid, 2-allyl-6-ethylphenoxyacetic acid, 2-allyl-4-chloro-6-methylphenoxyacetic acid, 2-allyl-4-methyl-6-chlorophenoxyacetic acid, and the like. The suitable o-allyl phenoxy acetic acids can be prepared, for example, by the reaction of an appropriate o-allylphenol with chloroacetic acid as described by Corson, B.B., et al., J. Org. Chem., 17, 971 (1952).

The acid halide of the phenoxy acetic acids of the present invention required in several of the following syntheses is prepared by the reaction of a phenoxy acetic acid compound of this invention with a phosphorus trihalide in the conventional manner. Thus, the treatment of an acid of the present invention with phosphorus trichloride until the reaction ceases produces the corresponding acid chloride.

Compounds which are salts, esters, or amides of the acids of this invention can be prepared readily from the free phenoxy acetic acid. Thus, treatment of the free acid with ammonium hydroxide gives a product which is the ammonium salt of the corresponding free acid. Similarly, an alkali metal salt of the free acid can be made by the treatment of the free acid with bases, such as the hydroxides, of alkali metals. Treatment of the acid with sodium hydroxide thus gives the sodium salt of the acid as the product, while the use of potassium hydroxide gives the potassium salt of the acid.

Amine salts of the acids described herein are prepared by the addition of the free acid to various amines. Typical amines which can be used to prepare such amine salts are dimethylamine, trimethylamine, triethylamine, diethanolamine, triethanolamine, isopropylamine, morpholine, and the like. The resulting products are, respectively, the dimethylamine, trimethylamine, triethylamine, diethanolamine, triethanolamine, isopropylamine, and morpholine salts of the corresponding phenoxy acetic acid. While other amine salts can be readily prepared, it is preferred to prepare the lower alkyl and alkanol amine salts.

Esters of the acids of this invention are prepared by the condensation of the acid with various alcohols. Thus, the condensation of ethyl alcohol with the free acid gives the desired ethyl ester. Other typical alcohols which can be used are methyl, propyl, isopropyl, n-butyl, sec-butyl, isobutyl, tert-butyl, amyl, hexyl, heptyl, octyl, nonyl, decyl, and the like. The products are the corresponding alkyl esters of the corresponding phenoxy acetic acid. Although such complex esters as those prepared by the esterification of the acids with butoxyethanol, propylene glycol butyl ether, and the like are useful products in accordance with this invention, preferred esters are those in which the esterifying group is an unsubstituted alkyl group which contains from 1 to 10 carbon atoms. The condensation of the acid with the alcohol is carried out suitably in an inert solvent such as an aromatic hydrocarbon and in the presence of a few percent by weight of an acid catalyst such as p-toluenesulfonic acid. The water which forms during the esterification reaction can be removed continuously in many cases from the reaction mixture by distillation as it forms, and its volume can be measured to determine when the esterification is complete. The ester is then isolated by distillation of the inert solvent.

Amides of the acids can be prepared conveniently by the reaction of the acid halide with ammonia or various amines. The reaction can be carried out in an inert solvent such as ether or benzene. Preferably two moles of the amine are used for each mole of the acid halide employed, since the hydrogen halide released during the reaction is taken up by some of the free amine which remains. The simplest amide, the corresponding phenoxy acetamide can be prepared by the reaction of the acid chloride with ammonia, either as the free gas or as an aqueous solution. This amide can also be prepared by hydrolysis of the corresponding nitrile. Substituted amides are prepared by the reaction of the acid halide with amines such as any of the primary or secondary amines suggested above for the preparation of the amine salts. Thus, for example, the reaction of the acid chloride with methylamine, butylamine, decylamine, or diethylamine gives the N-methyl-, N-butyl-, N-decyl-, or N,N-diethyl-amide of the corresponding acid, respectively. While more complex amines such as the aromatic amines can be used as the amine reactant to give desirable products, which are specifically named as anilides, preferred amine reactants are alkylamines containing up to 10 carbon atoms.

The manner in which the new compounds of this invention can be prepared is illustrated in the following examples.

EXAMPLE 1

*Preparation of o-(1,4,5,6,7,7-hexachlorobicyclo-[2.2.1] hept-5-en-2-yl methylene) phenoxy acetic acid*

Hexachlorocyclopentadiene (27.3 g.; 0.1 mol) which had been previously filtered through sodium carbonate, o-allyl phenoxy acetic acid (17 g.; 0.087 mol) prepared from o-allylphenol and chloroacetic acid is previously described, and xylene (100 ml.), were refluxed for 7 hours in a round-bottom flask fitted with a mechanical stirrer, internal thermometer, and reflux condenser. Upon cooling, solid starting material precipitated from solution and was removed by filtering the solution. The xylene solvent was removed in vacuo leaving solid crystals. The crystals were recrystallized from hexane, dissolved in 10% aqueous sodium hydroxide, and extracted with diethyl ether. The extract solution was shaken with 50% aqueous hydrochloric acid, decanted from the aqueous phase, dried over calcium chloride, filtered, and the ether removed in vacuo. The residue therefrom was recrystallized from hexane, refluxed with charcoal in acetone, filtered to remove the charcoal, stripped of acetone in vacuo, recrystallized from hexane, and dried to yield yellow crystals of o-(1,4,5,6,7,7-hexachlorobicyclo[2.2.1]hept-5-en-2-yl methylene) phenoxy acetic acid, melting point 122–4° C. The product had the following elemental analysis as calculated for $C_{16}H_{12}Cl_6O_3$:

| | C | H | Cl |
|---|---|---|---|
| Theoretical, percent | 41.34 | 2.58 | 45.75 |
| Found, percent | 41.55 | 2.78 | 45.32 |

EXAMPLE 2

*Preparation of o-(1,4,5,6-tetrachloro-7,7-dimethoxy-bicyclo[2.2.1]hept-5-en-2-yl methylene) phenoxy acetic acid*

1,2,3,4 - tetrachloro - 5,5 - dimethoxy - cyclopentadiene (106.6 g.; 0.4 mol.) prepared as described by Newcomer and McBee, J. Am. Chem. Soc., 71, 946 (1949), o-allyl phenoxy acetic acid (57.6 g.; 0.3 mol.), and xylene (500 g.) were mixed, decanted from any water present, and charged into a 1 liter round-bottom flask fitted with a mechanical stirrer, internal thermometer, and reflux condenser. The reaction solution was heated and maintained at 140° C. for about 6 hours. Upon cooling, the reaction solution was filtered and the filtrate stripped of xylene in vacuo leaving a dark-brown oily residue. The residue was dissolved in 10% aqueous sodium hydroxide and stripped of unreacted materials by diethyl ether extraction. The aqueous solution was acidified and the product extracted with diethyl ether, dried, evaporated in vacuo to about 10 cc. and recrystallized several times from hexane to yield o-(1,4,5,6-tetrachloro-7,7-dimethoxy-bicyclo[2.2.1]hept-5-en-2-yl methylene) phenoxy acetic acid as white crystals, melting point 149–151° C. The product had the following elemental analysis as calculated for $C_{18}H_{18}Cl_4O_5$:

| | C | H | Cl |
|---|---|---|---|
| Theoretical, percent | 47.39 | 3.98 | 31.09 |
| Found, percent | 47.01 | 3.96 | 32.26 |

Other new compounds which fall within the scope of this invention can be prepared readily in a manner similar to that detailed in the previous examples. Given in the following examples are the reactants required to prepare the resulting named compound of this invention. Hexachlorocyclopentadiene, 1,2,3,4,5 - pentachlorocyclopentadiene, 1,2,3,4-tetrachlorocyclopentadiene, 1,2,3,4-tetrachloro-5,5-dimethoxycyclopentadiene, and 1,2,3,4-tetrachloro-5,5-diethoxycyclopentadiene are designated as H, P, T, M, and E, respectively.

EXAMPLE 3 o-Allylphenoxyacetic acid+P=o-(1,4,5,6,7-pentachlorobicyclo[2.2.1]hept-5-en-2-yl methylene) phenoxy acetic acid.

EXAMPLE 4 o - Allylphenoxyacetic acid+T=o-(1,4,5,6-tetrachlorobicyclo[2.2.1]hept-5-en-2-yl methylene) phenoxy acetic acid.

EXAMPLE 5 o-Allyl phenoxy acetic acid+E=o-(1,4,5,6-tetrachloro-7,7 - diethoxybicyclo[2.2.1]hept - 5-en-2-yl methylene) phenoxy acetic acid.

EXAMPLE 6

2-allyl-4-chlorophenoxy acetic acid+H=2-(1,4,5,6,7,7-hexachlorobicyclo[2.2.1]hept-5 - en-2-yl methylene)-4-chlorophenoxy acetic acid.

EXAMPLE 7

2-allyl-6-chlorophenoxy acetic acid+P=2-(1,4,5,6,7-pentachlorobicyclo[2.2.1]hept - 5-en-2-yl methylene)-6-chlorophenoxy acetic acid.

EXAMPLE 8

2 - allyl-4-chlorophenoxy acetic acid+M=2-(1,4,5,6-tetrachloro - 7,7 - dimethoxybicyclo[2.2.1]hept-5-en-2-yl methylene)-4-chlorophenoxy acetic acid.

EXAMPLE 9

2-allyl-6-chlorophenoxy acetic acid+E=2-(1,4,5,6-tetrachloro-7,7-diethoxybicyclo[2.2.1]hept-5-en-2-yl methylene)-6-chlorophenoxy acetic acid.

EXAMPLE 10

2 - allyl-4-chlorophenoxy acetic acid+P=2-(1,4,5,6,7-pentachlorobicyclo[2.2.1]hept - 5-en-2-yl methylene)-4-chlorophenoxy acetic acid.

EXAMPLE 11

2-allyl-6-chlorophenoxy acetic acid+H=2-(1,4,5,6,7,7-hexachlorobicyclo[2.2.1]hept - 5-en-2-yl methylene)-6-chlorophenoxy acetic acid.

EXAMPLE 12

2-allyl-4-chlorophenoxy acetic acid+T=2-(1,4,5,6-tetrachlorobicyclo[2.2.1]hept - 5-en-2-yl methylene)-4-chlorophenoxy acetic acid.

EXAMPLE 13

2-allyl-4,6-dichlorophenoxy acetic acid+H=2-(1,4,5,6,7,7-hexachlorobicyclo[2.2.1]hept-5-en-2-yl methylene)-4,6-dichlorophenoxy acetic acid.

EXAMPLE 14

2-allyl-4,6-dichlorophenoxy acetic acid+M=2-(1,4,5,6-tetrachloro-7,7-dimethoxybicyclo[2.2.1]hept-5-en-2-yl methylene)-4,6-dichlorophenoxy acetic acid.

EXAMPLE 15

2-allyl-4-methylphenoxy acetic acid+H=2-(1,4,5,6,7,7-hexachlorobicyclo[2.2.1]hept-5-en-2-yl methylene)-4-methylphenoxy acetic acid.

EXAMPLE 16

2-allyl-4-methylphenoxy acetic acid+M=2-(1,4,5,6-tetrachloro-7,7-dimethoxybicyclo[2.2.1]hept-5-en-2-yl methylene)-4-methylphenoxy acetic acid.

EXAMPLE 17

*Preparation of the sodium salt of* o-*(1,4,5,6,7,7-hexachlorobicyclo[2.2.1]hept-5-en-2-yl methylene phenoxy acetic acid*

The product of Example 1 (0.5 mole) is dissolved in 500 cc. of methanol and treated with a solution of sodium hydroxide (20 g.; 0.5 mole) in 100 cc. of methanol. The methanol is removed by distillation in vacuo on the steam bath, and the solid residue is slurried with 100 cc. of cold, dry ether, filtered, pressed dry, and dried completely in a vacuum oven to give the desired sodium salt of o-(1,4,5,6,7,7-hexachlorobicyclo[2.2.1]hept-5-en-2-yl methylene) phenoxy acetic acid.

EXAMPLE 18

*Preparation of the ammonium salt of* o-*(1,4,5,6,-tetrachloro-7,7-dimethoxybicyclo[2.2.1]hept-5-en-2-yl methylene) phenoxy acetic acid*

Treatment of the product of Example 2 (0.5 mole) in 500 cc. of methanol with 34 cc. of commercial concentrated ammonium hydroxide according to the method given in the previous example gives the desired ammonium salt of o-(1,4,5,6-tetrachloro-7,7-dimethoxybicyclo-[2.2.1]hept-5-en-2-yl methylene) phenoxy acetic acid.

EXAMPLE 19

*Preparation of the dimethylamine salt of* o-*(1,4,5,6,7-pentachlorobicyclo[2.2.1]hept-5-en-2yl methylene) phenoxy acetic acid*

The product of Example 3 (0.5 mole) is dissolved in 500 cc. of dry ether and treated with dimethylamine (22.5 g.; 0.5 mole). The solid which separates is filtered, washed twice with 100 cc. portions of cold ether, filtered, pressed dry, and dried completely in a vacuum oven to give the desired dimethylamine salt of o-(1,4,5,6,7-pentachlorobicyclo[2.2.1]hept-5-en-2-yl methylene) phenoxy acetic acid.

EXAMPLE 20

*Preparation of the diethanolamine salt of o-(1,4,5,6-tetrachlorobicyclo[2.2.1]hept-5-en-2-yl methylene) phenoxy acetic acid*

In the manner described in the previous example, the product of Example 4 (0.5 mole) is treated with diethanolamine (52.5 g.; 0.5 mole) in 500 cc. of dry ether. The product which is isolated is the diethanolamine salt of o-(1,4,5,6-tetrachlorobicyclo[2.2.1]hept-5-en-2-yl methylene) phenoxy acetic acid.

EXAMPLE 21

*Preparation of morpholine salt of 2-(1,4,5,6,7,7-hexachlorobicyclo[2.2.1]hept-5-en-2-yl methylene)-4-chlorophenoxy acetic acid*

The product of Example 6 (0.5 mole) is treated with morpholine (43.5 g.; 0.5 mole) in 500 cc. of ether and the product is worked up as described for the preparation of the dimethylamine salt to give the desired morpholine salt of 2-(1,4,5,6,7,7-hexachlorobicyclo[2.2.1]hept-5-en-2-yl methylene)-4-chlorophenoxy acetic acid.

Similarly, the other acids of this invention are converted to their corresponding sodium, ammonium, and amine salts by the methods of Examples 17–21.

EXAMPLE 22

*Preparation of ethyl o-(1,4,5,6,7,7-hexachlorobicyclo[2.2.1]hept-5-en-2-yl methylene) phenoxy acetate*

The product of Example 1 (0.5 mole), ethyl alcohol (23 g.; 0.5 mole), and 3.0 g. of p-toluenesulfonic acid are dissolved in 500 ml. of benzene, and the solution is placed in a 1 liter, round-bottomed flask fitted with a reflux condenser and a calibrated Dean-Stark tube. The solution is heated at reflux temperature until 9 cc. of water have been collected in the Dean-Stark tube. The cooled reaction mixture is then extracted twice with 50-cc. portions of 10% sodium carbonate solution, and filtered. The benzene is distilled off in vacuo on the steam bath, and the residue is then distilled in vacuo to give the desired compound, ethyl o-(1,4,5,6,7,7-hexachlorobicyclo[2.2.1]hept-5-en-2-yl methylene) phenoxy acetate.

EXAMPLE 23

*Preparation of decyl o-(1,4,5,6-tetrachloro-7,7-dimethoxybicyclo[2.2.1]hept-5-en-2-yl methylene) phenoxy acetate*

In the manner and apparatus described in the previous example, the product of Example 2 (0.5 mole) and normal primary decyl alcohol (79 g.; 0.5 mole) are refluxed in 500 ml. of benzene in the presence of 3.0 g. of p-toluenesulfonic acid until 9 cc. of water have been distilled from the reaction mixture. Work-up of the reaction mixture as described in the previous example gives the desired compound, decyl o-(1,4,5,6-tetrachloro-7,7-dimethoxybicyclo[2.2.1]hept-5-en-2-yl methylene) phenoxy acetate.

EXAMPLE 24

*Preparation of the acid chloride of o-(1,4,5,6,7,7-hexachlorobicyclo[2.2.1]hept-5-en-2-yl methylene) phenoxy acetic acid*

The product of Example 1 (1 mole) is placed with 500 cc. of dry benzene in a 2-liter, 3-necked, round-bottomed flask fitted with a mechanical stirrer, reflux condenser (calcium chloride tube), and dropping funnel. Phosphorus trichloride (123 g.; 0.9 mole) is added slowly dropwise with vigorous stirring while the reaction flask is cooled with cold water if necessary to control the reaction. When all the $PCl_3$ has been added and the evolution of hydrogen chloride has ceased, the reaction mixture is then transferred to distillation apparatus, and the solvent is distilled off. The residue is then distilled in vacuo to give the desired o-(1,4,5,6,7,7-hexachlorobicyclo[2.2.1]hept-5-en-2-yl methylene) phenoxy acetyl chloride.

EXAMPLE 25

*Preparation of the amide of o-(1,4,5,6-tetrachloro-7,7-dimethoxybicyclo[2.2.1]hept-5en-2-yl methylene) phenoxy acetic acid.*

One mole of the acid chloride of the product of Example 2 is placed with 500 cc. of dry benzene in a 1-liter, 3-necked flask fitted with a reflux condenser, mechanical stirrer, and a gas inlet tube having a sparger tip. The mixture is stirred while dry ammonia gas is passed into the mixture for several hours. When two moles of ammonia gas has passed into the mixture, the precipitated salt is filtered off and extracted twice with 100 ml. portions of ether. The ether extracts and benzene filtrate are dried over magnesium sulfate and filtered, and the solvents are distilled off to give the desired o-(1,4,5,6-tetrachloro-7,7- dimethoxybicyclo[2.2.1]hept-5-en-2-yl methylene) phenoxy acetamide.

EXAMPLE 26

*Preparation of the N-n-decylamide of o-(1,4,5,6,7,7-hexachlorobicyclo[2.2.1]hept-5-en-2-yl methylene) phenoxy acetic acid*

One mole of the acid chloride product of Example 24 and 500 ml. of dry benzene are placed in a 2-liter, 3-necked, round-bottomed flask fitted with a mechanical stirrer, reflux condenser, internal thermometer, and dropping funnel. n-Decylamine (314 g.; 2.0 moles) in 250 ml. benzene is added dropwise with vigorous stirring. When all the amine has been added, the reaction mixture is stirred for 2 hours, after which the precipitated salt is filtered off and extracted with two 100 ml. portions of ether. The ether extracts and benzene filtrate are dried over magnesium sulfate and filtered. Distillation of the solvents gives the desired N-n-decylamide of o-(1,4,5,6,7,7-hexachlorobicyclo[2.2.1]hept-5-en-2-yl methylene) phenoxy acetic acid.

EXAMPLE 27

*Preparation of the N,N-diethylamide of o-(1,4,5,6-tetrachlorobicyclo[2.2.1]hept-5-en-2-yl methylene) phenoxy acetic acid*

One mole of the acid chloride of the product of Example 4 is treated with diethylamine (146 g., 2.0 moles) in the manner and apparatus described in the previous example to give the N,N-diethylamide of o-(1,4,5,6-tetrachlorobicyclo[2.2.1]hept-5-en-2-yl methylene) phenoxy acetic acid.

In each of the above examples, the other phenoxy acetic acid compounds can be substituted as the starting material to prepare their corresponding derivatives, which are within the scope of this invention.

The utility of the compounds of this invention was illustrated, for example, by experiments carried out for the systemic control of the pea aphid by root absorption and translocation. The test compounds were dissolved in acetone and dispersed in distilled water at the desired concentrations of actual chemical. Host plants, infested with adult aphids, were uprooted, washed free of soil, and placed in glass jars containing 100 cc. of the dispersed test compound. Aluminum foil was placed around the plant stem and jar to reduce possible escape of toxic vapors from the test dispersion. The test plants were maintained in this manner in the greenhouse for 72 hours and then observed for systemic aphicidal effectiveness. Three replicates were used for each treatment. In these experiments, the product of Example 2 used at a concentration of 100 p.p.m. gave 100% mortality of the aphids.

Experiments were also carried out for the systemic control of the two-spotted spider mite by root absorption and translocation. These experiments were identical to the previously described systemic aphicidal experiments, but used host plants infested with mixed life stages of the mites, which were treated and observed for systemic miticidal effectiveness, after being maintained in the greenhouse for seven days. In these experiments, the product of Example 1, used at a concentration of 100 p.p.m. gave 88.3% mortality.

Pesticidal compositions of this invention are prepared by mixing the new compounds of this invention or their derivatives with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention, or their derivatives, with finely divided solids such as the talcs, natural clays, pyrophyllite, diatomaceous earth, fuller's earth, or flours such as walnut shell or wheat flours. Other inert solid carriers of the type ordinarily used in preparing pest control compositions in dusts or powdered form can also be used.

Liquid compositions according to this invention are prepared by admixing one or more of the new compounds of this invention, or their derivatives, with a suitable inert liquid diluent. In some cases the compounds, or their derivatives, are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention and their derivatives. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 28

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

| | |
|---|---|
| o-(1,4,5,6,7,7-hexachlorobicyclo[2.2.1]hept-5-en-2-yl methylene) phenoxy acetic acid | 25 |
| Sodium lauryl sulfate | 2 |
| Sodium lignin sulfonate | 3 |
| Kerosene | 70 |

EXAMPLE 29

*Preparation of a wettable powder*

The following components are mixed intimately in conventional mixing or blending equipment and are then ground to a powder having an average particle size of less than about 50 microns. The finished powder is dispersed in water to give the desired concentration of active compound.

| | |
|---|---|
| o-(1,4,5,6-tetrachloro-7,7-dimethoxybicyclo[2.2.1]-hept-5-en-2-yl methylene) phenoxy acetic acid | 75.00 |
| Fuller's earth | 22.75 |
| Sodium lauryl sulfate | 2.00 |
| Methyl cellulose | .25 |

EXAMPLE 30

*Preparation of an emulsifiable concentrate of the n-butyl ester of o-(1,4,5,6,7,7-hexachlorobicyclo[2.2.1]hept-5-en-2-yl methylene) phenoxy acetic acid*

The following ingredients are mixed thoroughly:

| | |
|---|---|
| n-Butyl ester of the product of Example 1 | 59 |
| Xylene | 10 |
| Triton X–100 | 5 |
| Kerosene | 26 |

"Triton X–100" is the trade name under which an emulsifier of the alkyl aryl polyether alcohol type is sold. The above concentrate is diluted with water to the desired concentration for use.

EXAMPLE 31

*Preparation of a dust from the sodium salt of o-(1,2,3,4-tetrachloro-7,7-dimethoxybicyclo[2.2.1]hept-5-en-2-yl methylene) phenoxy acetic acid*

The sodium salt of the product of Example 2 (10 parts)

and talc (90 parts) are combined and ground to the desired particle size in a mechanical grinder-blender.

I claim:

1. A compound selected from the group consisting of a compound of the formula:

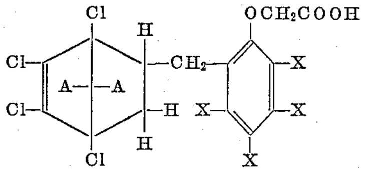

wherein each A is independently selected from the group consisting of chlorine and hydrogen atoms and unsubstituted lower alkoxy radicals and each X is independently selected from the group consisting of chlorine and hydrogen atoms and unsubstituted lower alkyl radicals; and their esters in which the esterifying alcohol is selected from the group consisting of unsubstituted alkyl alcohols of 1 to 10 carbon atoms and lower hydroxyalkyl alcohols; their alkali metal salts; their lower alkylamine salts; their lower alkanolamine salts; their morpholine salts; and their amides in which the amine group is selected from the group consisting of alkylamine groups having up to 10 carbon atoms and unsubstituted anilides.

2. o - (1,4,5,6,7,7 - hexachlorobicyclo[2.2.1] - hept - 5-en-2-yl methylene)-phenoxyacetic acid.

3. 2 - (1,4,5,6,7,7 - hexachlorobicyclo[2.2.1] - hept - 5-en-2-yl methylene)-4-chlorophenoxyacetic acid.

4. 2 - (1,4,5,6,7,7 - hexachlorobicyclo[2.2.1] - hept - 5-en-2-yl methylene)-4,6-dichlorophenoxyacetic acid.

5. 2 - (1,4,5,6 - tetrachloro - 7,7 - dimethoxybicyclo-[2.2.1]hept-5-en-2-yl methylene)-phenoxyacetic acid.

6. 2 - (1,4,5,6 - tetrachloro - 7,7 - diethoxybicyclo-[2.2.1]hept-5-en-2-yl methylene)-phenoxyactic acid.

7. 2 - (1,4,5,6,7 - pentachlorobicyclo[2.2.1] - hept - 5-en-2-yl methylene)-phenoxyacetic acid.

References Cited by the Examiner

UNITED STATES PATENTS

| | | | |
|---|---|---|---|
| 2,335,652 | 11/43 | D'Alelio | 260—473 |
| 2,430,722 | 11/47 | Ladd et al. | 167—30 |
| 2,484,296 | 10/49 | Kilgore | 260—559 |
| 2,523,187 | 9/50 | Britton et al. | 260—473 |
| 2,523,218 | 9/50 | Kenaga | 167—30 |
| 2,697,103 | 12/54 | Ordas | 260—468 |

NICHOLAS S. RIZZO, *Primary Examiner.*

IRVING MARCUS, DUVAL T. McCUTCHEN, WALTER A. MODANCE, *Examiners.*